United States Patent
Zhang et al.

(10) Patent No.: US 10,592,555 B1
(45) Date of Patent: Mar. 17, 2020

(54) INTELLIGENT CUSTOMER SERVICES BASED ON A VECTOR PROPAGATION ON A CLICK GRAPH MODEL

(71) Applicant: Alibaba Group Holding Limited, George Town (KY)

(72) Inventors: Wangshu Zhang, Hangzhou (CN); Zhiwei Shi, Hangzhou (CN); Junhong Liu, Hangzhou (CN); Jie Cai, Hangzhou (CN); Xiang Hu, Hangzhou (CN); Defeng Mao, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/390,173

(22) Filed: Apr. 22, 2019

Related U.S. Application Data

(63) Continuation of application No. PCT/CN2018/111714, filed on Oct. 24, 2018.

(51) Int. Cl.
| | | |
|---|---|---|
| *G06F 7/00* | (2006.01) | |
| *G06F 17/30* | (2006.01) | |
| *G06F 16/9032* | (2019.01) | |
| *G06F 16/9035* | (2019.01) | |
| *G06F 16/903* | (2019.01) | |
| *G06Q 30/00* | (2012.01) | |

(52) U.S. Cl.
CPC .... *G06F 16/90332* (2019.01); *G06F 16/9035* (2019.01); *G06F 16/90344* (2019.01); *G06Q 30/016* (2013.01)

(58) Field of Classification Search
None
See application file for complete search history.

(56) References Cited

U.S. PATENT DOCUMENTS

| | | | |
|---|---|---|---|
| 9,471,668 B1 | 10/2016 | Alupului et al. | |
| 2011/0270828 A1 | 11/2011 | Varma et al. | |
| 2013/0080162 A1* | 3/2013 | Chang | G10L 15/34 704/235 |
| 2014/0289231 A1* | 9/2014 | Palmert | G06F 17/277 707/723 |
| 2015/0019204 A1* | 1/2015 | Simard | G06F 17/2785 704/9 |
| 2015/0286747 A1* | 10/2015 | Anastasakos | G06F 16/9017 707/776 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Tuan A Pham
(74) *Attorney, Agent, or Firm* — Fish & Richardson P.C.

(57) ABSTRACT

A query is received from a user at a data service engine. The query includes a string of characters. A number of candidate topics are identified by the data service engine based on the query. A similarity score is determined between the query and each of the plurality of candidate topics based on a Vector Propagation On a Click Graph (VPCG) model trained based on user click data. A number of candidate topics are ranked based on the similarity scores. One or more topics are selected from the ranked candidate topics. The selected topics are outputted via a user interface (UI).

17 Claims, 7 Drawing Sheets

(56) References Cited

U.S. PATENT DOCUMENTS

2015/0332670 A1* 11/2015 Akbacak .............. G10L 15/063
704/9

OTHER PUBLICATIONS

Nakamoto, "Bitcoin: A Peer-to-Peer Electronic Cash System," www.bitcoin.org, 2005, 9 pages.
Extended European Search Report in European Application No. 18867294.3, dated Dec. 4, 2019, 7 pages.

* cited by examiner

… (1 / 16)

INTELLIGENT CUSTOMER SERVICES BASED ON A VECTOR PROPAGATION ON A CLICK GRAPH MODEL

CROSS-REFERENCE TO RELATED APPLICATIONS

This application is a continuation of PCT Application No. PCT/CN2018/111714, filed on Oct. 24, 2018, which is hereby incorporated by reference in its entirety.

TECHNICAL FIELD

This specification generally relates to natural language processing, especially in intelligent customer services.

BACKGROUND

As artificial intelligence (AI) has become increasingly popular, people are expecting more and more related products and services, such as robotic writing, robotic composition, and self-driving cars. One of the representative applications in the AI field is the intelligent customer service, which has been integrated into various aspects of people's lives. Intelligent customer service can communicate with users and automatically reply to user questions or queries about products or services to reduce the cost of customer service operations.

Natural language processing technology (NLP) helps enterprises to build intelligent customer service robots. NLP can improve service efficiency, and reduce the cost of manual services, helping companies to achieve a successful transition from traditional call centers to intelligent customer contact centers.

SUMMARY

Implementations of the present disclosure are generally directed to natural language processing in intelligent customer services. More particularly, implementations of the present disclosure are directed to intelligent customer services based on Vector Propagation on a Click Graph (VPCG) models.

In a general implementation, a query is received from a user at a data service engine. The query includes a string of characters. A number of candidate topics are identified by the data service engine based on the query. A similarity score is determined between the query and each of the plurality of candidate topics based on a Vector Propagation On a Click Graph (VPCG) model trained based on user click data. A number of candidate topics are ranked based on the similarity scores. One or more topics are selected from the ranked candidate topics. The selected topics are outputted via a user interface (UI).

Particular implementations of the subject matter described in this disclosure can be implemented so as to realize one or more of the following advantages. For example, the described subject matter can provide more relevant and accurate predictions of customer needs or intents, and solve customer questions, helping improve user experience and user satisfaction.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Like reference numbers and designations in the various drawings indicate like elements.

DETAILED DESCRIPTION

Figure 1:
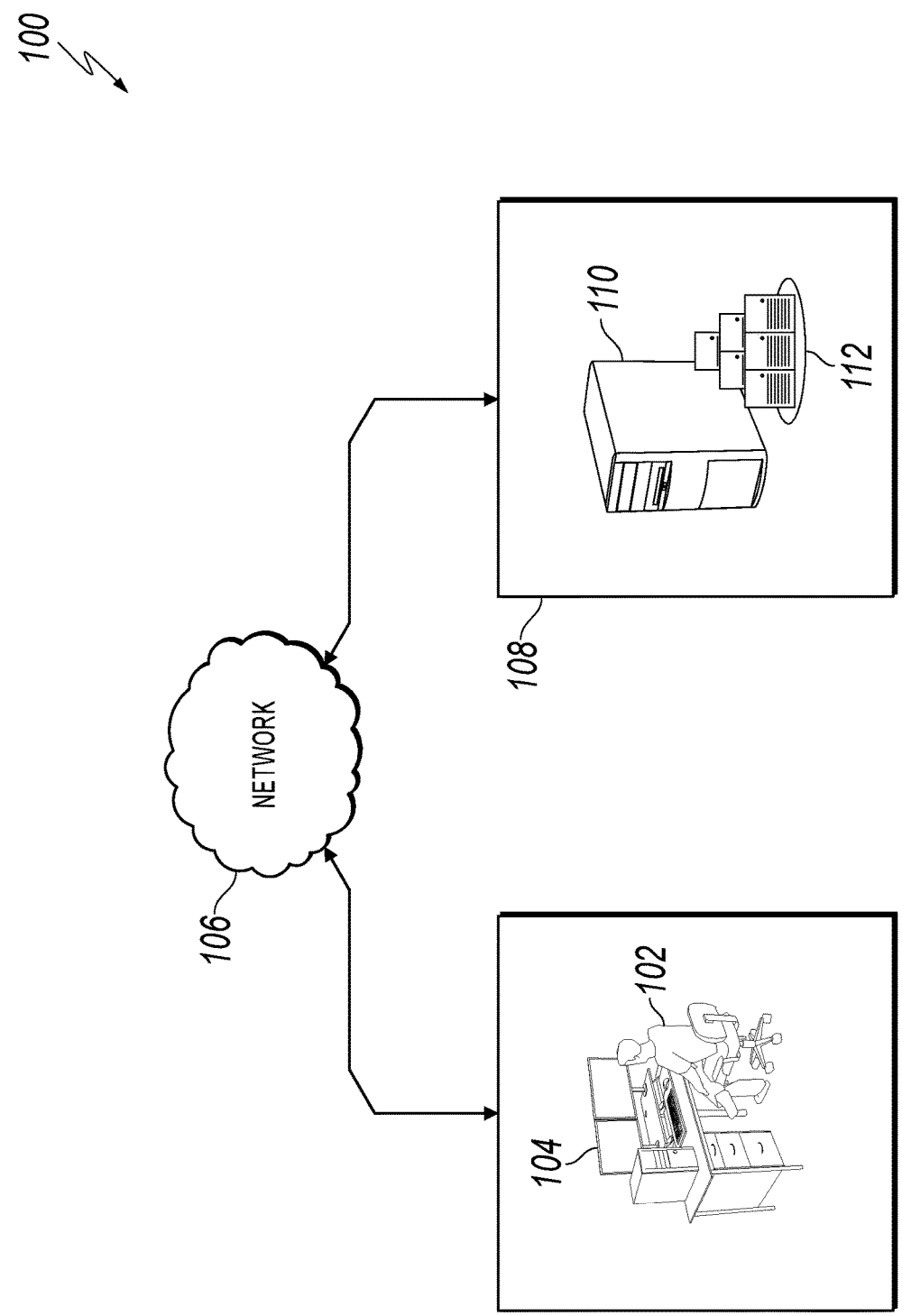
FIG. 1 is a block diagram illustrating an example environment for providing intelligent customer services based on Vector Propagation On a Click Graph (VPCG) models, according to an implementation of the present disclosure.

The following detailed description describes intelligent customer services based on Vector Propagation On a Click Graph (VPCG) models, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Intelligent customer service systems can interact with customers (or users) and provide automatic customer services by computer-implemented techniques. Example intelligent customer service systems can be implemented as, for example, a customer service robot or a question and answer (Q&A) system.

Existing technologies typically first analyze an input question and try to understand what the question is about, and then make a preliminary analysis on which method to use to answer the question. Some preliminary searches can be subsequently made and alternative answers can be generated. All generated answers will be scored. The answer having the highest score is considered to be the most useful and will be returned to the customer. Some Q&A systems determine categories of the questions or relevant knowledge fields based on the user questions using algorithms that only rely on the language expressed by the user. These systems suffer poor categorization results due to their deficiency in understanding or inferring user intents. For example, when using intelligent customer services, users are more likely to use colloquial and simplified languages during their interactions with the customer service robots. More than 50% of the questions asked by customers contain 10 or fewer words, especially in the cases where the customers initiate the questions. Relying solely on the user's literal expression and traditional natural language processing (NLP techniques to solve customers' problems has difficulties and limitations. With the increase of the number of customers using e-commerce applications, the number of questions asked by the customers and the complexity of such questions increase accordingly, posing additional challenges in providing intelligent customer services catered to user needs.

Implementations of this disclosure introduce intelligent customer services based on Vector Propagation On a Click Graph (VPCG) models to provide a more accurate prediction or determination of user need or intent in order to respond to user queries. The described implementations apply a VPCG model that is trained based on click data to, for example, a scoring process that calculates scores of the customer's questions and corresponding answers. The disclosed implementations can be integrated into a Q&A engine to achieve improved customer service.

In some implementations, in the scenario of customer service Q&A interactions, when uncertain about the answer to a customer's question, the intelligent customer service system can provide the customer with a number of (e.g., 3) answers and allow the customer to choose the most relevant answer to the customer's question. The system can thus collect a large number of different questions raised by different users, and their respective clicks or selections of the answers. The collection of the questions and selected answers constitutes user click data. The disclosed techniques leverage such data for mining user intents and matching correct topics or subject matters desired by the users.

In some implementations, the disclosed system uses a bipartite graph to model the user click data. The resulting bipartite graph can be referred to as a click graph. Vector propagation can be applied to the click graph to obtain vector representations of user queries and candidate topics. The topics can include, for example, the topic dealt with or the subject represented in the user's query. For example, the topics can include titles, categories, classifications, or other subject matters based on content or knowledge points in the user's query. As an example, a user query q can be "how to withdraw funds?", where the topics can include "cash out," "redemption," "bond," and other subject matter.

Based on the user click data, a VPCG model can be built that includes a vector representation of each of the user's queries and topics using word elements in a vocabulary. In some implementations, to extend the application of the VPCG model, a set of ngrams (also referred to as an ngram dictionary) can also be trained based on the user click data to obtain a vector representation of each ngram using the elements in the vocabulary. In the field of computational linguistics, an ngram can be a continuous sequence of n items from a given sample of text or speech. The items can be phonemes, syllables, letters, words, or base pairs according to the application.

Upon receiving a new query from a user, the disclosed system can predict a vector representation of the new query using the VPCG model, for example, based on the obtained vector presentations of the user queries or the vector representations of the ngrams. A score can be calculated based on the vector representation of the new query relative to the vector representation of each candidate topic. The calculated scores can be integrated into a search and ranking engine to help provide a better match between returned topics corresponding to the user's query. As a result, the intelligent customer system can provide enhanced user experience by showcasing a better understanding of the user's needs and intents.

FIG. 1 is a block diagram illustrating an example environment 100 for providing intelligent customer services based on Vector Propagation On a Click Graph (VPCG) models, according to an implementation of the present disclosure. The intelligent customer services can be provided, for example, by a data service engine that provides customers with answers to their questions. The example environment 100 includes a user 102, a computer 104, a network 106, and a back-end system 108. The example environment 100 can include additional users, computers, networks, systems, or other components. The example environment 100 can be configured in another manner in some implementations.

In some implementations, the network 106 includes a local area network (LAN), wide area network (WAN), the Internet, or a combination of these or other networks. The network 106 can include one or more of a wireless network or wireline networks. The network 106 connects computing devices (e.g., the computer 104) and back-end systems (e.g., the back-end system 108). In some implementations, the network 106 can be accessed over a wired and/or a wireless communications link.

In the depicted example, the back-end system 108 includes at least one server system 110 and a data store 112. In some implementations, the back-end system 110 provides access to one or more computer-implemented data services with which the computer 104 may interact. The computer-implemented data services may be hosted on, for example, the at least one server system 110 and the data store 112. The computer-implemented data services may include, for example, a Q&A data service that may be used by the computer 104 to provide a user with answers based on the user's questions and collected click data. For example, as part of the e-commerce financial service, the server system 110 may generate one or more answers corresponding to the user 102's questions regarding getting a small loan service.

In some implementations, the computer 104 sends the user 102's question to the server system 110 for obtaining corresponding answers. The server system 110 analyzes the received question and matches the content of the question to one or more topics stored in the data store 112. The server system 110 can provide intelligent customer services based on Vector Propagation On a Click Graph (VPCG) models in the example environment 100 dynamically, for example, by searching for the matched topics in real-time.

In some implementations, the back-end system 108 includes computer systems employing clustered computers and components to act as a single pool of seamless resources when accessed through the network 106. For example, such implementations may be used in a data center, cloud computing, storage area network (SAN), and network attached storage (NAS) applications. In some implementations, the back-end system 108 is deployed and provides computer-implemented services through a virtual machine(s).

Figure 2:
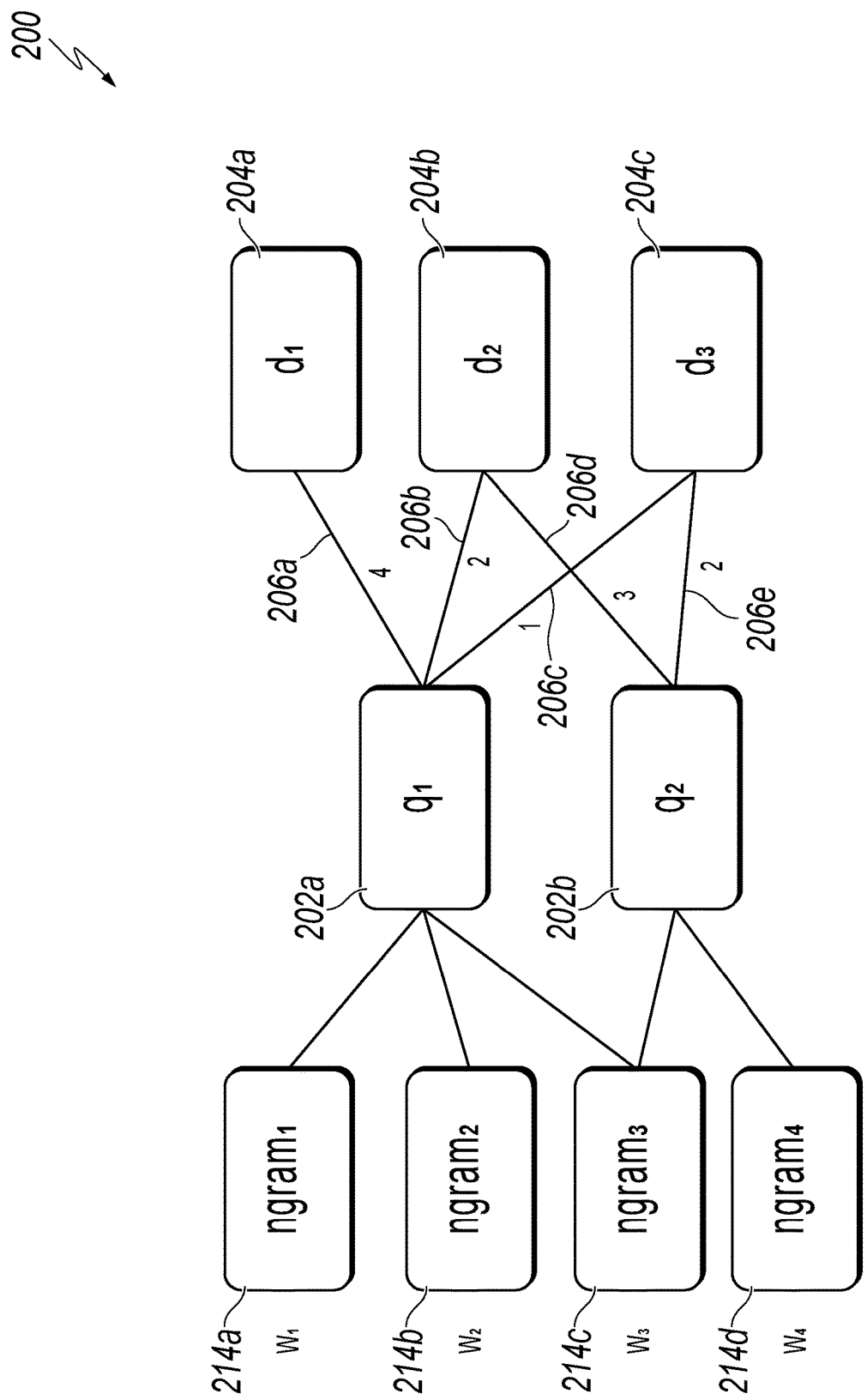
FIG. 2 is a block diagram illustrating an example process for training a VPCG model based on user click data, according to an implementation of the present disclosure.

FIG. 2 is a block diagram illustrating an example VPCG model 200 trained based on user click data, according to an implementation of the present disclosure. As illustrated in FIG. 2, the VPCG model 200 includes a click graph with a set of nodes 202a and 202b (collectively, query codes 202) that represent user queries $q_1$, and $q_2$, respectively, and another set of nodes 204a, 204b and 204c (collectively, topic codes 204) representing topics $d_1$, $d_2$, and $d_3$, respectively. The topic d can be, for example, one or more words, phrases, or other collections of word elements that represent a knowledge-point or a context-based subject matter. For example, the topics $d_1$, $d_2$, and $d_3$ can be "cash out," "redemption," and "bond," respectively.

Each edge between the query nodes 202 and the topic nodes 204, such as edge 206a, 206b, 206c, 206d, or 206e have a weight or value representing the number of user clicks (or selections) of a particular topic (or subject matter) corresponding to a particular query of the user. Because the click behavior of the same question for different users may be different, the weight values for different edges can be different.

In the exemplary embodiment illustrated by FIG. 2, there are three edges 206a, 206b, and 206c connecting user query $q_1$ 202a and topics $d_1$ 204a, $d_2$ 204b and $d_3$ 204c. The edge 206a has a weight value 4, the edge 206b has a weight value 2, and the edge 206c has a weight value 1. This indicates that when asking the same query $q_1$ and provided with candidate topics $d_1$, $d_2$, and $d_3$, four users click the topic $d_1$ 204a, two users click the topic $d_2$ 204b, and one user clicks the topic $d_3$ 204c. That is, for the same question query $q_1$, four users consider topic $d_1$ 204a is most relevant to their question, two users think topics $d_2$ 204b is most relevant to their question, and one user considers topic $d_3$ 204b to be most relevant to their question.

In the above example where $q_1$ represents the query from a user "how to withdraw funds?", and the candidate topics $d_1$, $d_2$, and $d_3$ topic can be "cash out," "redemption," and "bond," respectively, the weights for edges 206a, 206b, and 206c are 4, 2, and 1, respectively. This indicates after a group of customers asked the same question "how to withdraw funds?", the system provided them with three candidate knowledge point topics, "cash out," "redemption," and "bond" and let the customers to choose the one most relevant to their questions. Among the group of customers, four of them chose the knowledge point topic "cash out," two customers chose "redemption," and one customer chose "bond."

In some implementations, each of the user query q and topic d can be represented as a vector of word elements in a vocabulary. The vocabulary can include a dictionary of letters, words, phrases, or other entries that form the basis for vector representation of a longer string of characters (e.g., a query, a topic, or an ngram). In some implementations, the vector representation of each user query q can be initialized based on word elements in the vocabulary in a one-hot format or in another manner. Take the user query $q_i$ as an example. After query $q_i$ has been broken into segments and removed irrelevant and meaningless characters or words in each segment, query $q_i$ can be represented as a vector $q_1$: $w_1$, $w_2$, $w_4$, $w_6$, $w_k \in W$, k=1, 2, ..., v, where W is the vocabulary, a set of word elements, and the size or dimension of the set W is v. In some implementations, query $q_i$ can have a sparse representation $q_i$: ($w_1$:1, $w_2$:1, $w_4$:1, $w_6$:1).

In some implementations, after a vector representation of each user query $q_1$, $q_2$, ..., $q_n$ in the user click data is generated, a vector representation of each topic d in the user click data can also be generated based on the click bipartite graph in a similar manner. For example, a topic $d_i$ can be represented as a vector of the word elements based on the word elements in the same vocabulary. As an example, the topic $d_i$ may have a sparse representation $d_i$: ($w_i$:1, $w_j$:1), where $w_i$, $w_j \in W$.

In some implementations, the vector representations of each user query q and topic d can be obtained in an iterative manner. For example, the generated vector representations of the topic d are reversely propagated to update the vector representations of the user query q, and as such, one iteration is completed. Equations (1) and (2) below show examples of the vector representations of the user query q and topic d in the nth iteration:

$$d_j^{(n)} = \frac{1}{\left\| \sum_{i=1}^{Q} C_{i,j} \cdot q_i^{(n-1)} \right\|_2} \sum_{i=1}^{Q} C_{i,j} \cdot q_i^{(n-1)} \qquad \text{eq. 1}$$

$$q_i^{(n)} = \frac{1}{\left\| \sum_{j=1}^{D} C_{i,j} \cdot q_j^{(n-1)} \right\|_2} \sum_{j=1}^{D} C_{i,j} \cdot d_j^{(n)} \qquad \text{eq. 2}$$

where outputs $d_j^{(n)}$ and $q_i^{(n)}$ are the vector representation of topic $d_j$ and user query $q_i$ after the nth iteration. If it is the first iteration, $q_i^0$ represents the initial value of the vector representation of $q_i$. $C_{i,j}$ indicates the weight of the edge between $q_i$ and $d_j$ derived based on user click data as described with respect to the bipartite graph 200 in FIG. 2. For example, $C_{i,j}$ indicates the total number of user clicks or selections of topic $d_j$ for the user query $q_i$ in the user click data. If there is no edge connecting $q_i$ and $d_j$, the value is 0. Q represents the total number of user queries in the user click data, i.e., $q_i$, i=1, 2, ..., Q. D represents the total number of topics (e.g., knowledge point title vectors) in the user click data, i.e., $d_j$, j=1, 2, ..., D.

The total number of iterations can be, for example, pre-determined. For example, the iteration algorithm can be terminated when n=5, that is, iterate 5 times. After the iterative process ends, the vector representations of each user query q and topic d in the user click data can be generated.

Typically, queries from different users vary. The user queries in the user click data may not cover all possible questions users might ask. To generalize, in some implementations, a set of ngrams can be trained based on the user query in the user click data so that a new user query can be represented based on the set of ngrams. For example, the new user query q can be represented by a sequence, a weighted sum, or another combination of one or more ngrams. As illustrated in FIG. 2, nodes 214a, 214b, 214c, and 214d represent ngram1, ngram2, ngram3, and nrgam4, respectively. The ngram can be, for example, a completed word or phrase that appears frequently in customer questions. As an example, the query "how to withdraw funds" can be segmented into two ngrams, "how to" and "withdraw fund."

To convert a user query q into a representation of ngrams, a set G of ngrams (i.e., an ngram dictionary) can be obtained. The set G can be the full set of candidate ngrams used for representations of the user query q. In some implementations, each of the ngrams has an order up to 3. The ngrams can be sorted by the frequency of their occurrences. In some implementations, the set G can include a number of ngrams having the highest frequencies of occurrence. For example, the set G can include the g most frequently occurring ngrams. In this case, the size of set G is g, i.e., |G|=g.

In some implementations, the user query q can be represented using the ngrams in G according to, for example, a forward maximum match algorithm or another algorithm. In some implementations, the user query q can be represented using the ngrams in the ngram set G. FIG. 2 shows an ngram set G including $ngram_1$ 214a, $ngram_2$ 214b, $ngram_3$ 214c, and $ngram_4$ 214d. The ngram set G can include additional or different ngrams. As illustrated, $q_1$ can be represented using $ngram_1$, $ngram_2$, and $ngram_3$, and $q_2$ can be represented using $ngram_3$ and $ngram_4$.

Using the previously described iteration method, the vector representation of q can be propagated reversely to ngram, resulting in a vector representation of the ngram in terms of the user queries $q_i$, i=1, 2, ..., N. Since the vector representation of each user query q is generated after multiple iterations, for example, based on the example techniques described with respect to Equations (1) and (2), the vector representation of user query q can be regarded as complete and sufficient. In some implementations, only a reverse propagation is needed to generate the vector representation of the ngrams using the user queries $q_i$, i=1, 2, ..., N. For example, as shown in FIG. 2, the $ngram_3$ 214c can be represented using user query $q_1$ 202a and user query $q_2$ 202b.

In some implementations, a user query can be represented by the ngrams in G with respective weights. The weights corresponding to the ngrams can be calculated, for example, to have the vector representation of q after using the ngram as close as possible to the vector representation of q using the word elements in the vocabulary W. In some implementations, the weights corresponding to the ngrams can be calculated to minimize the error between these two values, for example, according to the following equation:

$$\min_W \sum_{i=1}^n \left\| q_i - \sum_{u_j \in G_{q_i}} w_j \cdot u_j \right\|_2^2 \quad \text{eq. 3}$$

where $u_j$ represents the vector representation of the ngram (in terms of word elements in the vocabulary W), j=1, g, $w_j$ is the weight corresponding to $u_j$, $q_i$ represents the vector representation of the query after iteration, $G_{q_i}$ represents the set of ngrams in the query $q_i$. In some implementations, the ngram weight $w_j \in W$ in the above equation can be iteratively calculated, for example, using the gradient descent method or another method. As shown in FIG. 2, $q_1$ can be represented using $ngram_1$, $ngram_2$, and $ngram_3$ with respective weights $w_1$, $w_2$ and $w_3$; $q_2$ can be represented using $ngram_3$ and $ngram_4$ with respective weights $w_3$ and $w_4$.

Figure 3:
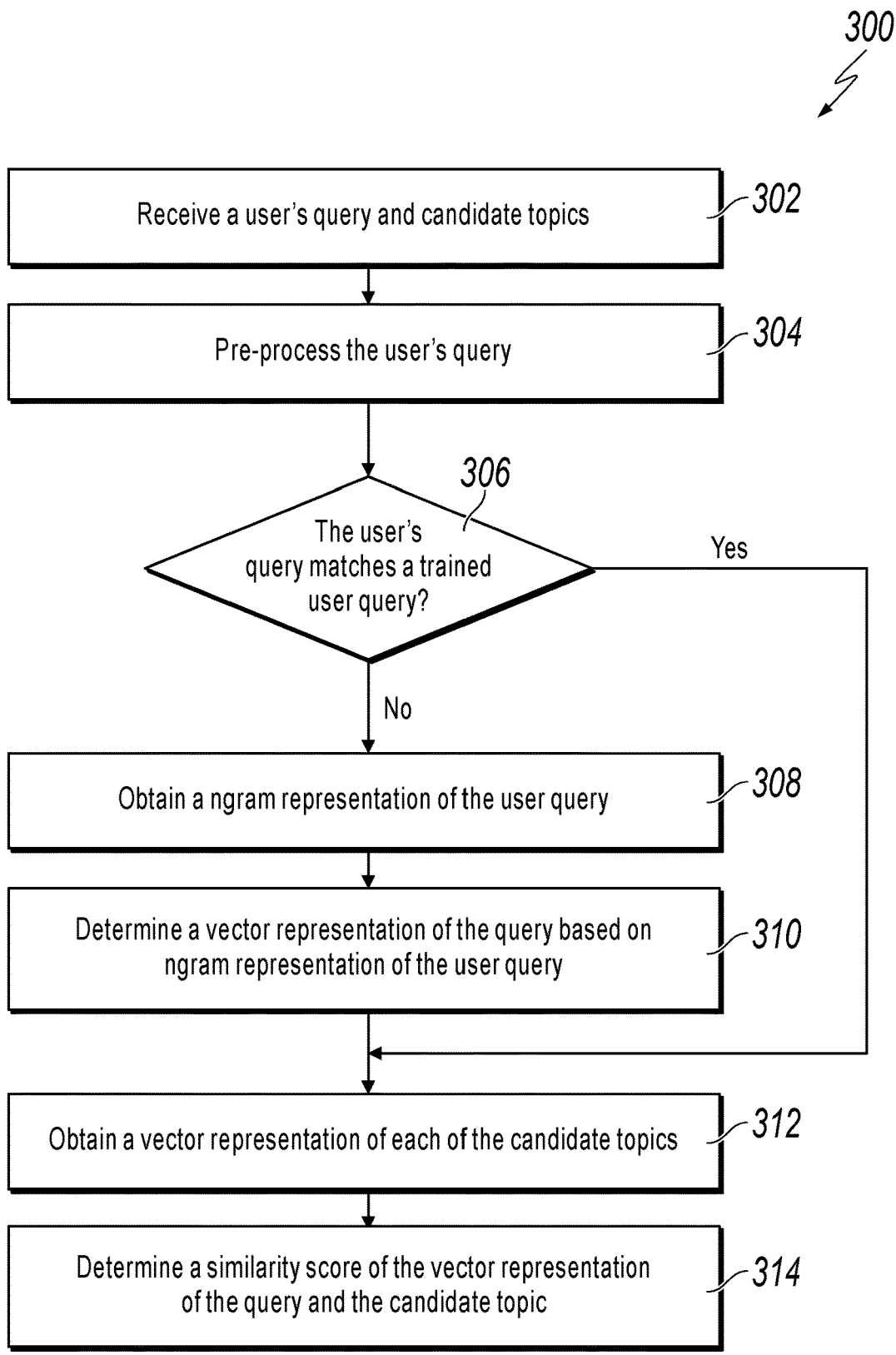
FIG. 3 is a flow chart illustrating an example process for calculating a score of a user query q and a candidate knowledge point topic d using a trained VPCG model, according to an implementation of the present disclosure.

FIG. 3 is a flow chart illustrating an example process 300 of calculating a score of a user query q and a candidate knowledge point topic d using a trained VPCG model, according to an implementation of the present disclosure. In some implementations, various steps of method 300 can be run in parallel, in combination, in loops, or in any order. For clarity of presentation, the description that follows generally describes method 300 in the context of the other figures in this description. However, it will be understood that method 300 may be performed, for example, by any suitable system, environment, software, and hardware, or a combination of systems, environments, software, and hardware, as appropriate. For example, the method 300 can be performed by a score engine or another data processing apparatus, which can include or be implemented by one or more processors.

At 302, a user's query and a number of candidate topics are received. The user query can be a new user query received from a Q&A system or another intelligent customer service platform. The number of candidate topics can be, for example, a full set of candidate topics used for user query matching, a pre-selected set of candidate topics (e.g., based on coarse or preliminary selection), or another predetermined number of candidate topics. In some implementations, the number of candidate topics can be from the trained VPCG model that includes trained vector representations of topics based on user click data. After 302, process 300 proceeds to 304.

At 304, the user's query can be pre-processed. For example, the query can be divided into segments, and irrelevant and meaningless words are removed from each segment. After 304, process 300 proceeds to 306.

At 306, it is determined whether the user's query matches a trained user query that has been trained by the user click data and stored in the VPCG model. If it is determined that the query matches a trained user query that has been iteratively calculated in the VPCG model (e.g., according to the techniques described with respect to FIG. 2), a trained vector representation of the user query can be obtained directly, for example, by retrieving the trained vector representation from a data store, and method 300 proceeds to 312. Otherwise, method 300 proceeds to 308

At 308, in response to determining that the user query does not match any trained user query in the VPCG model, an ngram representation of the user query can be obtained, for example, by the forward maximum matching algorithm or another algorithm. In other words, the user query is represented by one or more ngrams in an ngram set $G_{q_i}$ trained based on the user queries in the user click data (e.g., the ngram dictionary G as described with respect to FIG. 2). That is, q: $u_j$, $u_j \in G_{q_i}$. In some implementations, the user query can be expressed using the vector representation in terms of the one or more ngrams, for example, as a weighted sum based on the following equation:

$$q = \sum_{u_j \in G_{q_i}} w_j \cdot u_j \quad \text{eq. 4}$$

where $u_j$ represents a vector representation of an ngram, j=1, g; g represents the size of the ngram set $G_{q_i}$, $w_j$ represents the weight corresponding to ngram $u_j$; $q_i$ represents a vector representation of the user query i. After 308, process 300 proceeds to 310.

At 310, a vector representation of the query is determined based on the ngram representation of the user query. For example, the vector representation of the query can be determined based on vector representations and weights of the ngrams used in the ngram representation of the user query. As shown in the example with respect to Equation (4), the vector representation of the user query $q_i$ using word elements in the vocabulary is obtained by converting the user query $q_i$ into a weighted sum of ngrams $\{u_j\}$, where each $u_j$ is in its respective vector representation using word elements in the vocabulary. After 310, process 300 proceeds to 312.

At 312, a vector representation of each of the number of candidate topics is obtained. In some implementations, the vector representation of each of the number of candidate topics can be retrieved from the trained VPCG model that includes trained vector representations of topics based on user click data. In some implementations, the vector representation of each of the number of candidate topics can be obtained in another manner such as an ngram representation similar to the techniques described above with respect to the user query. After 312, process 300 proceeds to 314.

At 314, a similarity score of the vector representation of the query and the candidate topic is determined. By converting the user query and each of the candidate topics in respective vector representation, the user query can be compared with each of the candidate topics efficiently, for example, by correlation or computing a distance or error metric of the two based on their respective vector representations. The distance or error metric between a pair of the user query and each of the candidate topics can be returned as the similarity score that is used to determine the similarity or match of the user query with each of the candidate topics. In some implementations, a cosine distance between the vector representations of the user query and a candidate topic is calculated as an example of the similarity score that is outputted. After 314, process 300 ends.

Figure 4:
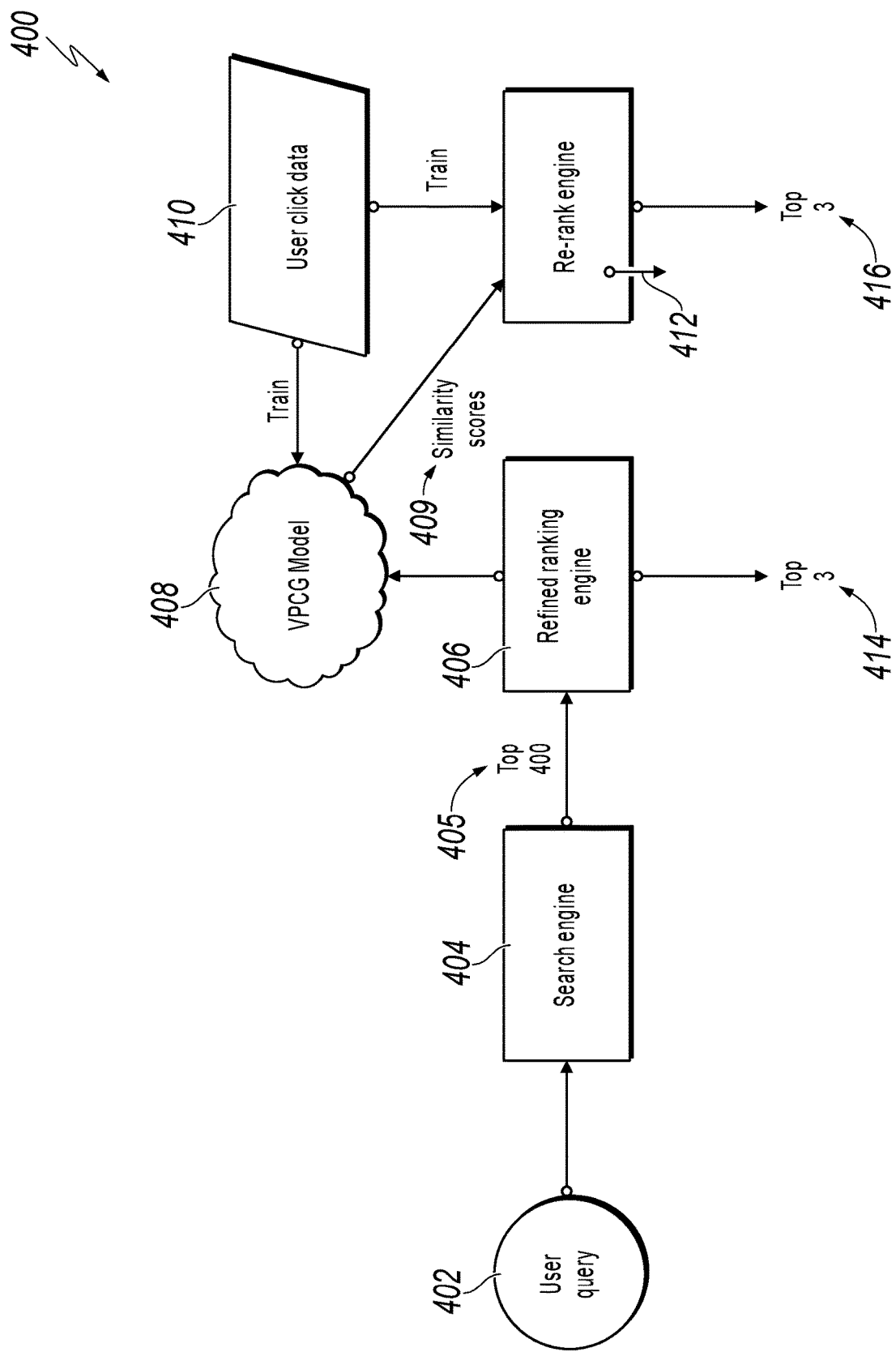
FIG. 4 is a block diagram illustrating an example system providing intelligent customer services based on a VPCG model, according to an implementation of the present disclosure.

FIG. 4 is a block diagram illustrating an example system 400 providing intelligent customer services based on a VPCG model, according to an implementation of the present disclosure. The system 400 includes a search engine 404, a refined ranking engine 406 and a re-rank engine 412. The system 400 can receive user query 402 and output a predetermined number of topics (e.g., top 3 topics 414 or 416) that are most relevant to the user query 402, for example, based on the similarity scores. The system 400 also uses a VPCG model 408 that is trained based on user click data 410 for determining the top 3 topics 416, for example, based on re-ranking performed by the similarity scores output from the example process 300 based on the re-rank engine 412.

The input user query 402 can text-based. A user can make a query in written or orally, which can be subsequently converted to text. After the system 400 received the user query 402, the search engine 404 (e.g., Apache Lucene search system) can recall all topics stored in the system database to have a coarse ranking (or sorting) of the topics based on the relevancy of each of the topics with respect to the user query 402. In some implementations, the search engine can retrieve, for example, a predetermined number of topics (e.g., the top 400 topics 405) to feed into the refined ranking engine 406. Within the search engine 404, topics that are irrelevant to the customer query 402 can be filtered out.

The recalled top 400 topics 405 can serve as candidate topics for refined ranking by the refined ranking engine 406. Features associated with the user query 402 and the topics can be extracted. Ranking scores associated with these features, such as a Word Mover's Distance (WMD) score, Second Sort score, intention tree score, etc., can be calculated. The calculated ranking scores can be sorted by the refined ranking engine 406 using, for example, a LamdaMart model. If a number of the top-ranked topics satisfy specific criteria (e.g., the scores are sufficiently high or beyond a pre-determined confidence threshold) that indicates good matches have been found, the number of the top ranked topics (e.g., the top 3 topics 414) can be output, for example, to the user via a user interface (UI) as the result of the refined ranking. Otherwise, the refined ranking engine 406 can call the VPCG model 408 to further calculate a similarity score 409 of the user query and each of the candidate topics.

The re-rank engine 412 can receive the similarity scores 409 calculated based on the VPCG model 408, for example, according to the techniques described with respect to FIG. 3. The re-rank engine 412 can re-rank the candidate topics based on the similarity scores 409 as well as other ranking scores based on a ranking model, for example, a Gradient Boosting Decision Tree (GBDT) model such as LamdaMART. As a result, a number of the top-ranked topics (e.g., the top 3 topics 416) can be output, for example, to the user via a user interface (UI) as the result of the re-ranking. In some implementations, the user click data 410 can be used to train the ranking model as well, for example, to determine the importance of certain ranking features based on Gini coefficients or other criteria. In some implementations, the user click data 410 includes about 1.5 million click logs from the user. The VPCG model 408 and re-rank engine 412 can use the user click data 410 in their respective training processes.

Figure 5:
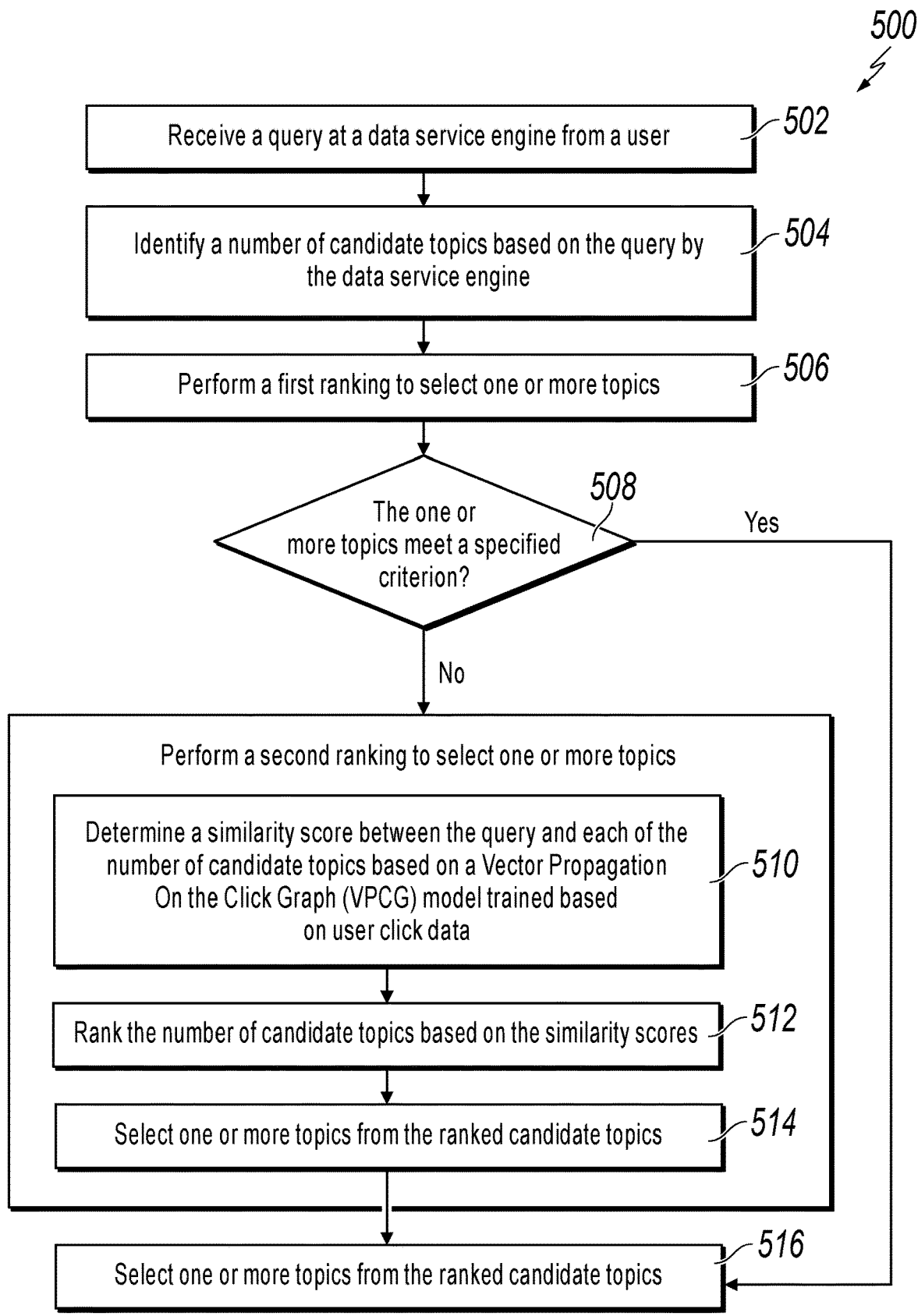
FIG. 5 is a flow chart illustrating an example process for providing intelligent customer services based on a VPCG model, according to an implementation of the present disclosure.

FIG. 5 is a flowchart illustrating an example method 500 for providing intelligent customer services based on a VPCG model, according to an implementation of the present disclosure. In some implementations, various steps of method 500 can be run in parallel, in combination, in loops, or in any order. For clarity of presentation, the description that follows generally describes method 500 in the context of the other figures in this description. However, it will be understood that method 500 may be performed, for example, by any suitable system, environment, software, and hardware, or a combination of systems, environments, software, and hardware, as appropriate. For example, the method 500 can be performed by a data service engine or another data processing apparatus, which can include or be implemented by one or more processors. The example system 400 is an example of the data service engine.

At 502, a query is received at a data service engine from a user. The query can include a string of characters, for example, a series of characters or word elements. The query can be received, for example, from a user interface (UI) of a Q&A system or another intelligent customer service platform. A user can make a text-based query or a verbal query, and in the latter case, the verbal query can be converted to text before it is received at the data service engine. After 502, process 500 proceeds to 504.

At 504, a number of candidate topics are identified based on the query by the data service engine. Identifying a number of candidate topics can include, for example, obtaining a number of candidate topics from a memory or another data store (e.g., a trained VPCG model that includes trained vector representation of topics based on user click data), retrieving a number of candidate topics from another source, receiving the candidate topics from a device, or otherwise determining the candidate topics. After 504, process 500 proceeds to 506.

At 506, a first ranking is performed to select one or more topics. In some implementations, the first rank can be a coarse ranking (or sorting) or preliminary selection of the topics based on the relevancy of each of the topics with respect to the query, for example, according to techniques described with respect to FIG. 4. After 506, process 500 proceeds to 508.

At 508, it is determined whether the one or more topics meet a specified criterion. In response to determining that the one or more topics meet a specified criterion (e.g., whether the one or more topics are sufficiently relevant to the query based on certain metrics such as scores and confidence thresholds according to the techniques described with respect to FIG. 4), the one or more topics can be output, for example, to the user via a user interface (UI) of an intelligent customer service platform, and method 500 proceeds to 516. Otherwise, if it is determined that no topic meets the specified criterion, a second ranking (e.g., a refined ranking according to the techniques described with respect to FIG. 4) to select one or more topics will be performed, and method 500 proceeds to 510.

At 510, a similarity score between the query and each of the number of candidate topics is determined based on a Vector Propagation On a Click Graph (VPCG) model trained based on user click data. In some implementations, the user click data comprise a plurality of user selections in response to a plurality of queries from a plurality of users, wherein each of the plurality of user selections comprises a respective user's selection of a relevant topic to the user's query among a plurality of candidate topics provided to the user based on the user's query.

Example techniques of training the VPCG model are described with respect to FIG. 2. In some implementations, training the VPCG model includes identifying a plurality of queries from a plurality of users in the user click data; identifying a plurality of user selections in response to the plurality of queries from the plurality of users in the user data; determining a vector representation of each of the plurality of queries in terms of a plurality of word elements in a vocabulary; and determining a vector representation of each of the plurality of candidate topics in terms of the plurality of word elements in the vocabulary.

In some implementations, the determining a vector representation of each of the plurality of queries in terms of a plurality of word elements in a vocabulary comprises representing the each of the plurality of queries using the plurality of candidate topics. For example, the representing the each of the plurality of candidate topics using the plurality of queries comprises representing each of the plurality of queries according to Equation (1).

In some implementations, the determining a vector representation of each of the plurality of candidate topics in terms of the plurality of word elements in the vocabulary comprises representing the each of the plurality of candidate topics using the plurality of queries. For example, the representing the each of the plurality of queries using the plurality of candidate topics comprises representing each of the plurality of candidate topics by a weighted sum of the plurality of queries according to Equation (2).

In some implementations, determining a similarity score includes, for example, converting the query and each of the candidate topics in respective vector representation, computing a distance or error metric of the two based on their respective vector representations, and returning the distance or error metric between a pair of the user query and each of the candidate topics as the similarity score. In some implementations, a cosine distance between the vector representations of the user query and a candidate topic is calculated as an example of the similarity score that is outputted.

For example, determining a similarity score between the query and each of the plurality of candidate topics based on a VPCG model trained based on user click data comprises determining a vector representation of the query from the user in terms of the plurality of word elements in the vocabulary; determining a vector representation of each of the plurality of candidate topics in terms of the plurality of word elements in the vocabulary; calculating the similarity score between a vector representation of the query and the vector representation of each of the plurality of candidate topics.

In some implementations, determining a vector representation of the query from the user in terms of the plurality of word elements in the vocabulary comprising representing the query from the user based on a set of ngrams trained based on the user click data. In some implementations, the set of ngrams comprises a vector representation of each ngram in the set of ngrams in terms of the plurality of word elements in the vocabulary based on the vector representation of each of the plurality of queries in the user click data.

In some implementations, representing the query from the user based on a set of ngrams trained based on the user click data comprises representing the query from the user as a weighted sum the set of ngrams, according to Equation (4). After 510, process 500 proceeds to 512.

At 512, the number of candidate topics are ranked based on the similarity scores. In some implementations, the data service engine can receive the similarity score determined at 510, and rank or re-rank the candidate topics based on the similarity scores. In some implementations, the data service engine will also use other ranking scores based on a ranking model, for example, a GDBP model when ranking the candidate topics, for example, according to the techniques described with respect to FIG. 4. After 512, process 500 proceeds to 514.

At 514, one or more topics are selected from the ranked candidate topics. In some implementations, for example, a number of top-ranked topics (e.g., the top 3 topics) can be selected from the ranked candidate topics. After 514, process 500 proceeds to 516.

At 516, the selected topics are output via a user interface (UI) of the data service engine. In some implementations, the selected topics can be displayed in a table, a chat box, a pop window, etc. in a graphic user interface (GUI) or other UI. After 516, process 500 stops.

Figure 6:
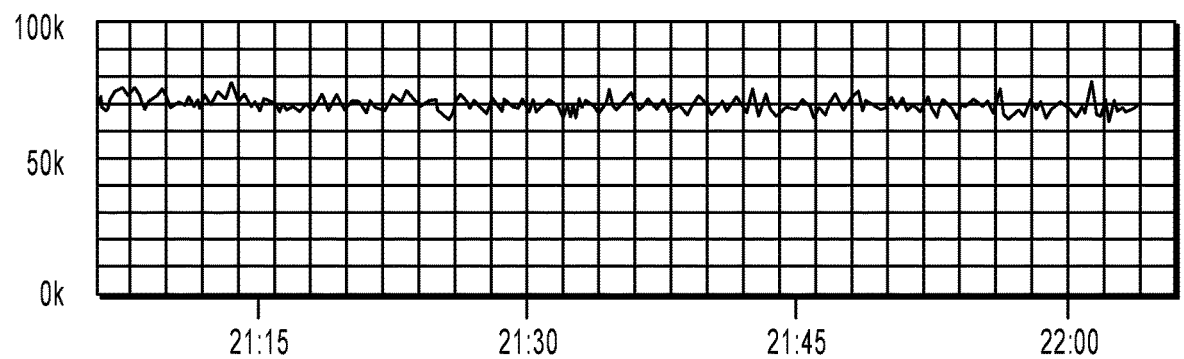
FIG. 6 is a plot illustrating a performance comparison between intelligent customer services based on a VPCG model and a Deep-Semantic-Similarity-Model (DSSM), according to an implementation of the present disclosure.
Figure 6:
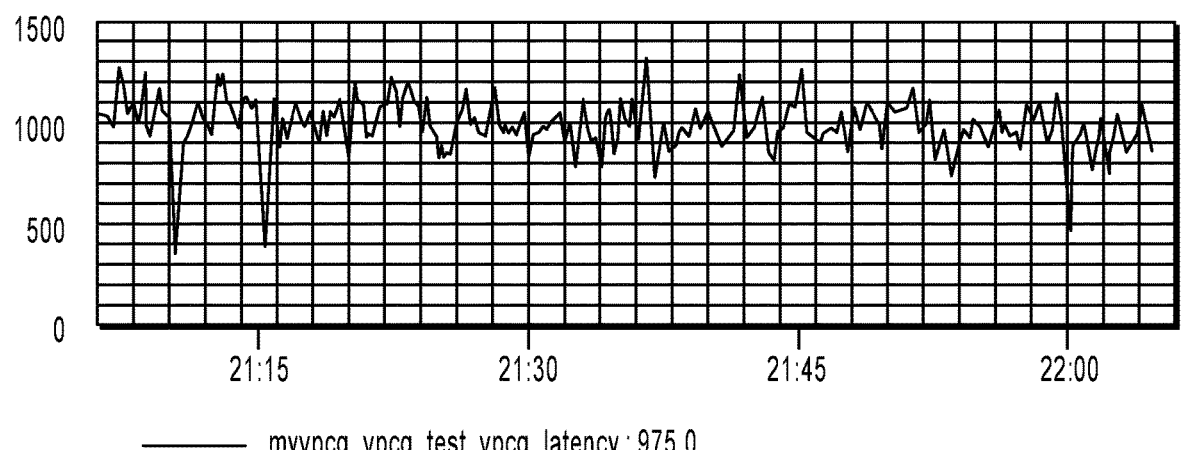

FIG. 6 is a plot illustrating a performance comparison between intelligent customer services based on a VPCG model and a Deep Semantic Similarity Model (DSSM), according to an implementation of the present disclosure. As illustrated in FIG. 6, the VPCG model's score plug-in is based on C++ code-based model server deployment, with an average call delay of about 1 ms, while the DSSM takes nearly 70 ms, which shows that the VPCG model greatly improves the efficiency of online operations and reduces the algorithm latency. Given more candidate topics, the VPCG-model-based implementation can achieve more time saving. With the introduction of the re-ranker engine based on the VPCG model, the result of the LambdaMart sorting improves the ndcg@1 indicator by 2%, and the on-line test single-engine resolution rate increases by about 1.5%.

Table 1 shows several example vector representations of user queries. Under the "Vector Representation" column, each word or phrase (e.g., "fund" or "transfer out") preceding the colon (":") represents a work element in the vocabulary. The value (e.g., "0.83" and "0.06") following the colon (":") represents a weight corresponding to the word element. As shown in Table 1, based on the VPCG model, the content of a user query can be represented by the word elements more comprehensively, even by word elements that do not appear in the user query. The VPCG model can also learn various vector representations through machine learning. For example, the vector representation of the user query "How to redeem the fund," includes word elements "sell," "transfer," "sale," etc., fully expressing the semantics of the user query. Such a representation can better match the user's needs or intents, and thus provide more appropriate or effective answer to the user's query.

TABLE 1

Example Vector Representations of User Queries based on a VPCG Model

| User queries | Vector representations |
| --- | --- |
| How to redeem the fund | fund:0.83 how:0.36 sell:0.21 redeem:0.18 how:0.18 money:0.14 out:0.06 transfer out:0.06 sale:0.05 can:0.05 transfer:0.05 |
| How to check all the bank transaction | Bank card:0.62 transaction:0.41 how:0.26 check:0.22 bill:0.22 search:0.16 how is it:0.14 Alipay:0.13 record:0.11 all:0.08 money:0.08 view:0.08 card number:0.08 balance:0.06 |
| Orde payment has not arrived yet | Order:0.36 not:0.36 arrive:0.33 payment:0.31 no:0.30 how:0.26 money:0.22 succeed:0.22 yet:0.21 pay:0.20 show:0.16 transaction:0.14 |

Figure 7:
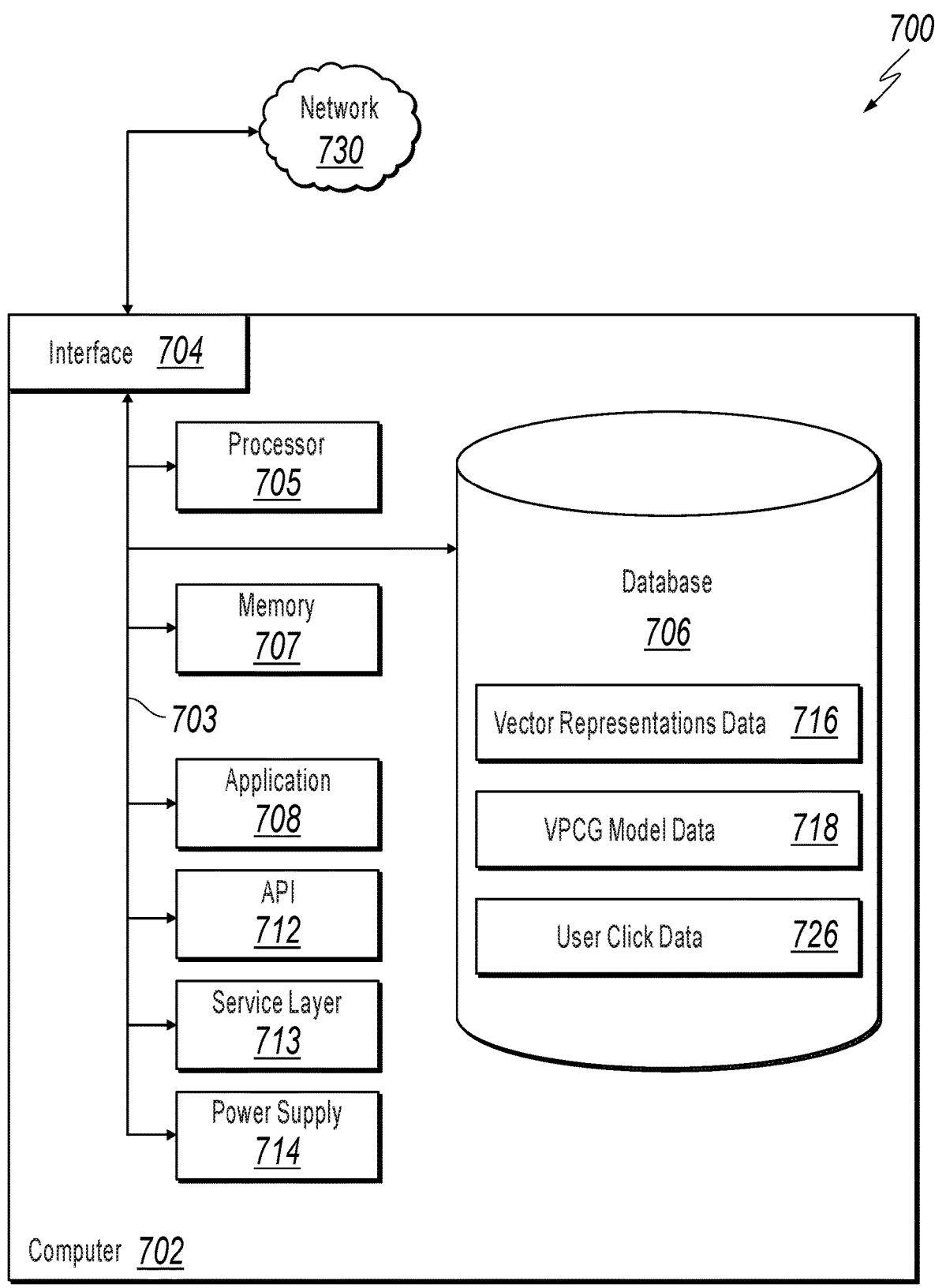
FIG. 7 is a block diagram illustrating an example computer system used to provide computational functionalities associated with described algorithms, methods, functions, processes, flows, and procedures as described in the instant disclosure, according to an implementation of the present disclosure.

FIG. 7 is a block diagram of an example computer system 700 used to provide computational functionalities associated with described algorithms, methods, functions, processes, flows, and procedures, as described in the instant disclosure, according to an implementation. The illustrated computer 702 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 702 may comprise a computer that includes an input device, such as a keypad, keyboard, touch screen, or other device that can accept user information, and an output device that conveys information associated with the operation of the computer 702, including digital data, visual, or audio information (or a combination of information), or a graphical-type user interface (UI) (or GUI).

The computer 702 can serve in a role as a client, network component, a server, a database or other persistency, or any other component (or a combination of roles) of a computer system for performing the subject matter described in the instant disclosure. The illustrated computer 702 is communicably coupled with a network 730. In some implementations, one or more components of the computer 702 may be configured to operate within environments, including cloud-computing-based, local, global, or other environment (or a combination of environments).

At a high level, the computer 702 is an electronic computing device operable to receive, transmit, process, store, or manage data and information associated with the described subject matter. According to some implementations, the computer 702 may also include or be communicably coupled with an application server, e-mail server, web server, caching server, streaming data server, or other server (or a combination of servers).

The computer 702 can receive requests over network 730 from a client application (for example, executing on another computer 702) and respond to the received requests by processing the received requests using an appropriate software application(s). In addition, requests may also be sent to the computer 702 from internal users (for example, from a command console or by other appropriate access method), external or third-parties, other automated applications, as well as any other appropriate entities, individuals, systems, or computers.

Each of the components of the computer 702 can communicate using a system bus 703. In some implementations, any or all of the components of the computer 702, hardware or software (or a combination of both hardware and software), may interface with each other or the interface 704 (or a combination of both), over the system bus 703 using an application programming interface (API) 712 or a service layer 713 (or a combination of the API 712 and service layer 713). The API 712 may include specifications for routines, data structures, and object classes. The API 712 may be either computer-language independent or dependent and refer to a complete interface, a single function, or even a set of APIs. The service layer 713 provides software services to the computer 702 or other components (whether or not illustrated) that are communicably coupled to the computer 702. The functionality of the computer 702 may be accessible for all service consumers using this service layer. Software services, such as those provided by the service layer 713, provide reusable, defined functionalities through a defined interface. For example, the interface may be software written in JAVA, C++, or other suitable language providing data in extensible markup language (XML) format or other suitable format. While illustrated as an integrated component of the computer 702, alternative implementations may illustrate the API 712 or the service layer 713 as stand-alone components in relation to other components of the computer 702 or other components (whether or not illustrated) that are communicably coupled to the computer 702. Moreover, any or all parts of the API 712 or the service layer 713 may be implemented as child or sub-modules of another software module, enterprise application, or hardware module without departing from the scope of this disclosure.

The computer 702 includes an interface 704. Although illustrated as a single interface 704 in FIG. 7, two or more interfaces 704 may be used according to particular needs, desires, or particular implementations of the computer 702. The interface 704 is used by the computer 702 for communicating with other systems that are connected to the network 730 (whether illustrated or not) in a distributed environment. Generally, the interface 704 comprises logic encoded in software or hardware (or a combination of software and hardware) and is operable to communicate with the network 730. More specifically, the interface 704 may comprise software supporting one or more communication protocols associated with communications such that the network 730 or interface's hardware is operable to communicate physical signals within and outside of the illustrated computer 702.

The computer 702 includes a processor 705. Although illustrated as a single processor 705 in FIG. 7, two or more processors may be used according to particular needs, desires, or particular implementations of the computer 702. Generally, the processor 705 executes instructions and manipulates data to perform the operations of the computer 702 and any algorithms, methods, functions, processes, flows, and procedures as described in the instant disclosure.

The computer 702 also includes a database 706 that can hold data for the computer 702 or other components (or a combination of both) that can be connected to the network 730 (whether illustrated or not). For example, database 706 can be an in-memory, conventional, or other type of database storing data consistent with this disclosure. In some implementations, database 706 can be a combination of two or more different database types (for example, a hybrid in-memory and conventional database) according to particular needs, desires, or particular implementations of the computer 702 and the described functionality. Although illustrated as a single database 706 in FIG. 7, two or more databases (of the same or combination of types) can be used according to particular needs, desires, or particular implementations of the computer 702 and the described functionality. While database 706 is illustrated as an integral component of the computer 702, in alternative implementations, database 706 can be external to the computer 702. As illustrated, the database 706 holds one or more vector representations data 716 which can include vector representation of user queries, candidate topics, ngrams, etc., VPCG model data 718, and click data 726.

The computer 702 also includes a memory 707 that can hold data for the computer 702 or other components (or a combination of both) that can be connected to the network 730 (whether illustrated or not). Memory 707 can store any data consistent with this disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 (of the same or combination of types) can be used according to particular needs, desires, or particular implementations of the computer 702 and the described functionality. While memory 707 is illustrated as an integral component of the computer 702, in alternative implementations, memory 707 can be external to the computer 702.

The application 708 is an algorithmic software engine providing functionality according to particular needs, desires, or particular implementations of the computer 702, particularly with respect to functionality described in this disclosure. For example, application 708 can serve as one or more components, modules, or applications. Further, although illustrated as a single application 708, the application 708 may be implemented as multiple applications 708 on the computer 702. In addition, although illustrated as integral to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion or management circuits (including recharging, standby, or other power management functionality). In some implementations, the power-supply 714 can include a power plug to allow the computer 702 to be plugged into a wall socket or other power source to, for example, power the computer 702 or recharge a rechargeable battery.

There may be any number of computers 702 associated with, or external to, a computer system containing computer 702, each computer 702 communicating over network 730. Further, the term "client," "user," and other appropriate terminology may be used interchangeably, as appropriate, without departing from the scope of this disclosure. Moreover, this disclosure contemplates that many users may use one computer 702, or that one user may use multiple computers 702.

Described implementations of the subject matter can include one or more features, alone or in combination.

For example, in a first implementation, a computer-implemented method comprising: receiving, at a data service engine, a query from a user, wherein the query comprises a string of characters; identifying, by the data service engine, multiple candidate topics based on the query; determining a similarity score between the query and each of the multiple candidate topics based on a Vector Propagation On a Click Graph (VPCG) model trained based on user click data; ranking the multiple candidate topics based on the similarity scores; selecting one or more topics from the ranked candidate topics; and outputting the selected topics via a user interface (UI).

The foregoing and other described implementations can each, optionally, include one or more of the following features:

A first feature, combinable with any of the following features, further comprising, before determining a similarity score between the query and each candidate topic based on a Vector Propagation On a Click Graph (VPCG) model trained based on user click data, performing a first ranking to select a second one or more topics from the plurality of candidate topics. In response to determining that each of the second one or more topics does not meet a specified criterion, performing a second ranking based on the VPCG model trained based on user click data, wherein performing the second ranking comprises the determining a similarity score between the query and each candidate topic based on a VPCG model trained based on user click data; and the ranking the plurality of candidate topics based on the similarity scores.

A second feature, combinable with any of the previous or following features, wherein the user click data comprise a plurality of user selections in response to a plurality of queries from a plurality of users, wherein each of the plurality of user selections comprises a respective user's selection of a relevant topic to the user's query among a plurality of candidate topics provided to the user based on the user's query.

A third feature, combinable with any of the previous or following features, further comprising training the VPCG model based on the user click data, wherein the training the VPCG model comprises, identifying a plurality of queries from a plurality of users in the user click data; identifying a plurality of user selections in response to the plurality of queries from the plurality of users in the user data; determining a vector representation of each of the plurality of queries in terms of a plurality of word elements in a vocabulary; and determining a vector representation of each of the plurality of candidate topics in terms of the plurality of word elements in the vocabulary.

A fourth feature, combinable with any of the previous or following features, wherein, the determining a vector representation of each of the multiple queries in terms of a number of word elements in a vocabulary comprises representing the each of a number of queries using the plurality of candidate topics; and the determining a vector representation of each of the multiple of candidate topics in terms of a number of word elements in the vocabulary comprises representing the each of a number of candidate topics using the plurality of queries.

A fifth feature, combinable with any of the previous or following features, wherein the representing the each of the multiple candidate topics using the multiple candidate topics comprises representing each of the multiple queries by a weighted sum of the multiple queries according to equation:

$$d_j^{(n)} = \frac{1}{\left\| \sum_{i=1}^{Q} C_{i,j} \cdot q_i^{(n-1)} \right\|_2} \sum_{i=1}^{Q} C_{i,j} \cdot q_i^{(n-1)}$$

and the representing the each of the plurality of queries using the plurality of queries comprises representing each of the plurality of candidate topics according to equation:

$$q_i^{(n)} = \frac{1}{\left\|\sum_{j=1}^{D} C_{i,j} \cdot q_j^{(n-1)}\right\|_2} \sum_{j=1}^{D} C_{i,j} \cdot d_j^{(n)}$$

wherein $d_j^{(n)}$ represents a vector representation of topic $d_j$ in the (n)th interation; $q_j^{(n-1)}$ represents a vector representation of query $q_i$ in the (n−1) th interation; $C_{i,j}$ represents a total number of user clicks or selections of the topic $d_j$ for the query $q_i$ in the user click data; Q represents the total number of user queries in the user click data, i.e., $q_i$, i=1, 2, . . . , Q. D represents the total number of titles in the user click data, i.e., $d_j$, j=1, 2, . . . , D.

A sixth feature, combinable with any of the previous or following features, wherein the determining a similarity score between the query and each of the multiple candidate topics based on a VPCG model trained based on user click data comprises, determining a vector representation of the query from the user in terms of the multiple word elements in the vocabulary; determining a vector representation of each of the multiple candidate topics in terms of the plurality of word elements in the vocabulary; and calculating the similarity score between a vector representation of the query and the vector representation of each of the multiple candidate topics.

A seventh feature, combinable with any of the previous or following features, wherein the determining a vector representation of the query from the user in terms of the plurality of word elements in the vocabulary comprising representing the query from the user based on a set of ngrams trained based on the user click data.

A eighth feature, combinable with any of the previous or following features, wherein the set of ngrams comprises a vector representation of each ngram in the set of ngrams in terms of the multiple word elements in the vocabulary based on the vector representation of each of the multiple queries in the user click data.

A ninth feature, combinable with any of the previous or following features, wherein the representing the query from the user based on a set of ngrams trained based on the user click data comprises representing the query from the user as a weighted sum the set of ngrams, according to equation:

$$q = \sum_{u_j \in G_{q_i}} w_j \cdot u_j$$

wherein $u_j$ represents a vector representation of ngram j, j=1, g; g represents a total number of ngrams in the set of the ngrams; $w_j$ represents a weight corresponding to $u_j$; $G_{q_i}$ the set of the ngrams trained based on the user click data.

In a second implementation, a computer-implemented system comprising: one or more computers; and one or more computer memory devices interoperably coupled with the one or more computers and having tangible, non-transitory, machine-readable media storing instructions, that when executed by the one or more computers, perform operations comprising: receiving, at a data service engine, a query from a user, wherein the query comprises a string of characters; identifying, by the data service engine, multiple candidate topics based on the query; determining a similarity score between the query and each of the multiple candidate topics based on a Vector Propagation On a Click Graph (VPCG) model trained based on user click data; ranking the multiple candidate topics based on the similarity scores; selecting one or more topics from the ranked candidate topics; and outputting the selected topics via a user interface (UI).

The foregoing and other described implementations can each, optionally, include one or more of the following features:

A first feature, combinable with any of the following features, the operations further comprising, before determining a similarity score between the query and each candidate topic based on a Vector Propagation On a Click Graph (VPCG) model trained based on user click data, performing a first ranking to select a second one or more topics from the plurality of candidate topics; and in response to determining that each of the second one or more topics does not meet a specified criterion, performing a second ranking based on the VPCG model trained based on user click data, wherein performing the second ranking comprises: the determining a similarity score between the query and each candidate topic based on a VPCG model trained based on user click data; and the ranking the plurality of candidate topics based on the similarity scores.

A second feature, combinable with any of the previous or following features, wherein the user click data comprise a plurality of user selections in response to a plurality of queries from a plurality of users, wherein each of the plurality of user selections comprises a respective user's selection of a relevant topic to the user's query among a plurality of candidate topics provided to the user based on the user's query.

A third feature, combinable with any of the previous or following features, the operations further comprising training the VPCG model based on the user click data, wherein the training the VPCG model comprises, identifying a plurality of queries from a plurality of users in the user click data; identifying a plurality of user selections in response to the plurality of queries from the plurality of users in the user data; determining a vector representation of each of the plurality of queries in terms of a plurality of word elements in a vocabulary; and determining a vector representation of each of the plurality of candidate topics in terms of the plurality of word elements in the vocabulary.

A fourth feature, combinable with any of the previous or following features, wherein, the determining a vector representation of each of the multiple queries in terms of a number of word elements in a vocabulary comprises representing the each of a number of queries using the plurality of candidate topics; and the determining a vector representation of each of the multiple of candidate topics in terms of a number of word elements in the vocabulary comprises representing the each of a number of candidate topics using the plurality of queries.

A fifth feature, combinable with any of the previous or following features, wherein the representing the each of the multiple candidate topics using the multiple candidate topics comprises representing each of the multiple queries by a weighted sum of the multiple queries according to equation:

$$d_j^{(n)} = \frac{1}{\left\|\sum_{i=1}^{Q} C_{i,j} \cdot q_i^{(n-1)}\right\|_2} \sum_{i=1}^{Q} C_{i,j} \cdot q_i^{(n-1)};$$

and the representing the each of the plurality of queries using the plurality of queries comprises representing each of the plurality of candidate topics according to equation:

$$q_i^{(n)} = \frac{1}{\left\|\sum_{j=1}^{D} C_{i,j} \cdot q_j^{(n-1)}\right\|_2} \sum_{j=1}^{D} C_{i,j} \cdot d_j^{(n)}$$

wherein $d_j^{(n)}$ represents a vector representation of topic $d_j$ in the (n)th interation; $q_j^{(n-1)}$ represents a vector representation of query $q_i$ in the (n-1) th interation; $C_{i,j}$ represents a total number of user clicks or selections of the topic $d_j$ for the query $q_i$ in the user click data; Q represents a total number of user queries in the user click data, i.e., $q_i$, i=1, 2, . . . . Q; D represents a total number of topics in the user click data, i.e., $d_j$, j=1, 2, . . . , D.

A sixth feature, combinable with any of the previous or following features, wherein the determining a similarity score between the query and each of the multiple candidate topics based on a VPCG model trained based on user click data comprises, determining a vector representation of the query from the user in terms of the multiple word elements in the vocabulary; determining a vector representation of each of the multiple candidate topics in terms of the plurality of word elements in the vocabulary; and calculating the similarity score between a vector representation of the query and the vector representation of each of the multiple candidate topics.

A seventh feature, combinable with any of the previous or following features, wherein the determining a vector representation of the query from the user in terms of the plurality of word elements in the vocabulary comprising representing the query from the user based on a set of ngrams trained based on the user click data.

A eighth feature, combinable with any of the previous or following features, wherein the set of ngrams comprises a vector representation of each ngram in the set of ngrams in terms of the multiple word elements in the vocabulary based on the vector representation of each of the multiple queries in the user click data.

A ninth feature, combinable with any of the previous or following features, wherein the representing the query from the user based on a set of ngrams trained based on the user click data comprises representing the query from the user as a weighted sum the set of ngrams, according to equation:

$$q = \sum_{u_j \in G_{q_i}} w_j \cdot u_j$$

wherein $u_j$ represents a vector representation of ngram j, j=1, g; g represents a total number of ngrams in the set of the ngrams; $w_j$ represents a weight corresponding to $u_j$; $G_{q_i}$ the set of the ngrams trained based on the user click data.

In a third implementation, a non-transitory, computer-readable medium storing one or more instructions executable by a computer-implemented system to perform operations comprising: receiving, at a data service engine, a query from a user, wherein the query comprises a string of characters; identifying, by the data service engine, multiple candidate topics based on the query; determining a similarity score between the query and each of the multiple candidate topics based on a Vector Propagation On a Click Graph (VPCG) model trained based on user click data; ranking the multiple candidate topics based on the similarity scores; selecting one or more topics from the ranked candidate topics; and outputting the selected topics via a user interface (UI).

The foregoing and other described implementations can each, optionally, include one or more of the following features:

A first feature, combinable with any of the following features, the operations further comprising, before determining a similarity score between the query and each candidate topic based on a Vector Propagation On a Click Graph (VPCG) model trained based on user click data, performing a first ranking to select a second one or more topics from the plurality of candidate topics; and in response to determining that each of the second one or more topics does not meet a specified criterion, performing a second ranking based on the VPCG model trained based on user click data, wherein performing the second ranking comprises: the determining a similarity score between the query and each candidate topic based on a VPCG model trained based on user click data; and the ranking the plurality of candidate topics based on the similarity scores.

A second feature, combinable with any of the previous or following features, wherein the user click data comprise a plurality of user selections in response to a plurality of queries from a plurality of users, wherein each of the plurality of user selections comprises a respective user's selection of a relevant topic to the user's query among a plurality of candidate topics provided to the user based on the user's query.

A third feature, combinable with any of the previous or following features, the operations further comprising training the VPCG model based on the user click data, wherein the training the VPCG model comprises, identifying a plurality of queries from a plurality of users in the user click data; identifying a plurality of user selections in response to the plurality of queries from the plurality of users in the user data; determining a vector representation of each of the plurality of queries in terms of a plurality of word elements in a vocabulary; and determining a vector representation of each of the plurality of candidate topics in terms of the plurality of word elements in the vocabulary.

A fourth feature, combinable with any of the previous or following features, wherein, the determining a vector representation of each of the multiple queries in terms of a number of word elements in a vocabulary comprises representing the each of a number of queries using the plurality of candidate topics; and the determining a vector representation of each of the multiple of candidate topics in terms of a number of word elements in the vocabulary comprises representing the each of a number of candidate topics using the plurality of queries.

A fifth feature, combinable with any of the previous or following features, wherein the representing the each of the multiple candidate topics using the multiple candidate topics comprises representing each of the multiple queries by a weighted sum of the multiple queries according to equation:

$$d_j^{(n)} = \frac{1}{\left\|\sum_{i=1}^{Q} C_{i,j} \cdot q_i^{(n-1)}\right\|_2} \sum_{i=1}^{Q} C_{i,j} \cdot q_i^{(n-1)};$$

and the representing the each of the plurality of queries using the plurality of queries comprises representing each of the plurality of candidate topics according to equation:

$$q_i^{(n)} = \frac{1}{\left\|\sum_{j=1}^{D} C_{i,j} \cdot q_j^{(n-1)}\right\|_2} \sum_{j=1}^{D} C_{i,j} \cdot d_j^{(n)}$$

wherein $d_j^{(n)}$ represents a vector representation of topic $d_j$ in the (n)th interation; $q_i^{(n-1)}$ represents a vector representation of query $q_i$ in the (n–1) th interation; $C_{i,j}$ represents a total number of user clicks or selections of the topic $d_j$ for the query $q_i$ in the user click data; Q represents the total number of user queries in the user click data, i.e., $q_i$, i=1, 2, ..., Q; D represents the total number of topics in the user click data, i.e., $d_j$, j=1, 2, ..., D.

A sixth feature, combinable with any of the previous or following features, wherein the determining a similarity score between the query and each of the multiple candidate topics based on a VPCG model trained based on user click data comprises, determining a vector representation of the query from the user in terms of the multiple word elements in the vocabulary; determining a vector representation of each of the multiple candidate topics in terms of the plurality of word elements in the vocabulary; and calculating the similarity score between a vector representation of the query and the vector representation of each of the multiple candidate topics.

A seventh feature, combinable with any of the previous or following features, wherein the determining a vector representation of the query from the user in terms of the plurality of word elements in the vocabulary comprising representing the query from the user based on a set of ngrams trained based on the user click data.

A eighth feature, combinable with any of the previous or following features, wherein the set of ngrams comprises a vector representation of each ngram in the set of ngrams in terms of the multiple word elements in the vocabulary based on the vector representation of each of the multiple queries in the user click data.

A ninth feature, combinable with any of the previous or following features, wherein the representing the query from the user based on a set of ngrams trained based on the user click data comprises representing the query from the user as a weighted sum the set of ngrams, according to equation:

$$q = \sum_{u_j \in G_{q_i}} w_j \cdot u_j$$

wherein $u_j$ represents a vector representation of ngram j, j=1, g; g represents a total number of ngrams in the set of the ngrams; $w_j$ represents a weight corresponding to $u_j$; $G_{q_i}$ the set of the ngrams trained based on the user click data.

Implementations of the subject matter and the functional operations described in this behavior can be implemented in digital electronic circuitry, in tangibly embodied computer software or firmware, in computer hardware, including the structures disclosed in this behavior and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware. Data processing hardware encompass all kinds of apparatuses, devices, and machines for processing data, including by way of example, a programmable processor, a computer, or multiple processors or computers. The computer can also be, or further include special purpose logic circuitry, for example, a central processing unit (CPU), a field programmable gate array (FPGA), or an application-specific integrated circuit (ASIC). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this behavior can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this behavior can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this behavior, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this behavior contains many specific implementation details, these should not be construed as limitations on the scope of any inventive concept or on the scope of what can be claimed, but rather as descriptions of features that can be specific to particular implementations of particular inventive concepts. Certain features that are described in this behavior in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
receiving, at a data service engine, a query from a user, wherein the query comprises a string of characters;
identifying, by the data service engine, a plurality of candidate topics based on the query;
determining a similarity score between the query and each of the plurality of candidate topics based on a Vector Propagation On a Click Graph (VPCG) model trained based on user click data, wherein the VPCG model is trained by:
identifying a plurality of queries from a plurality of users in the user click data;
identifying a plurality of user selections in response to the plurality of queries from the plurality of users in the user click data;
determining a vector representation of each of the plurality of queries in terms of a plurality of word elements in a vocabulary, wherein the determining the vector representation of each of the plurality of queries in terms of the plurality of word elements in the vocabulary comprises representing the each of the plurality of queries based on a vector representation of each of plurality of candidate topics, a total number of user clicks or selections of a candidate topic for a query in the user click data and a total number of topics in the user click data; and
determining a vector representation of each of the plurality of candidate topics in terms of the plurality of word elements in the vocabulary, wherein the determining the vector representation of each of the plurality of candidate topics in terms of the plurality of word elements in the vocabulary comprises representing the each of the plurality of candidate topics based on a vector representation of each of the plurality of queries, a total number of user clicks or selections of a candidate topic for a query in the user click data and a total number of user queries in the user click data; and
ranking the plurality of candidate topics based on the similarity scores;
selecting one or more topics from the ranked candidate topics; and
outputting the topics via a user interface (UI).

2. The computer-implemented method of claim 1, further comprising:
before determining a similarity score between the query and each candidate topic based on a Vector Propagation On a Click Graph (VPCG) model trained based on user click data, performing a first ranking to select a second one or more topics from the plurality of candidate topics;
in response to determining that each of the second one or more topics does not meet a specified criterion, performing a second ranking based on the VPCG model trained based on user click data, wherein performing the second ranking comprises:
the determining a similarity score between the query and each candidate topic based on a VPCG model trained based on user click data; and
the ranking the plurality of candidate topics based on the similarity scores.

3. The computer-implemented method of claim 1, wherein the user click data comprise a plurality of user selections in response to a plurality of queries from a plurality of users, wherein each of the plurality of user selections comprises a respective user's selection of a relevant topic to the user's query among a plurality of candidate topics provided to the user based on the user's query.

4. The computer-implemented method of claim 1, further comprising training the VPCG model based on the user click data.

5. The computer-implemented method of claim 1, wherein the determining a similarity score between the query and each of the plurality of candidate topics based on a VPCG model trained based on user click data comprises:
   determining a vector representation of the query from the user in terms of a plurality of word elements in a vocabulary;
   determining a vector representation of each of the plurality of candidate topics in terms of the plurality of word elements in the vocabulary; and
   calculating the similarity score between a vector representation of the query and the vector representation of each of the plurality of candidate topics.

6. The computer-implemented method of claim 5, wherein the determining a vector representation of the query from the user in terms of the plurality of word elements in the vocabulary comprising representing the query from the user based on a set of ngrams trained based on the user click data.

7. The computer-implemented method of claim 6, wherein the set of ngrams comprises a vector representation of each ngram in the set of ngrams in terms of the plurality of word elements in the vocabulary based on the vector representation of each of a plurality of queries in the user click data.

8. The computer-implemented method of claim 6, wherein the representing the query from the user based on a set of ngrams trained based on the user click data comprises representing the query from the user as a weighted sum the set of ngrams based on a vector representation of each ngram in the set of ngrams, and a weight corresponding to the vector representation of each ngram.

9. A computer-implemented system comprising:
   one or more computers; and
   one or more computer memory devices interoperably coupled with the one or more computers and having tangible, non-transitory, machine-readable media storing instructions, that when executed by the one or more computers, perform operations comprising:
      receiving, at a data service engine, a query from a user, wherein the query comprises a string of characters;
      identifying, by the data service engine, a plurality of candidate topics based on the query;
      determining a similarity score between the query and each of the plurality of candidate topics based on a Vector Propagation On a Click Graph (VPCG) model trained based on user click data, wherein the VPCG model is trained by:
         identifying a plurality of queries from a plurality of users in the user click data;
         identifying a plurality of user selections in response to the plurality of queries from the plurality of users in the user click data;
         determining a vector representation of each of the plurality of queries in terms of a plurality of word elements in a vocabulary, wherein the determining the vector representation of each of the plurality of queries in terms of the plurality of word elements in the vocabulary comprises representing the each of the plurality of queries based on a vector representation of each of plurality of candidate topics, a total number of user clicks or selections of a candidate topic for a query in the user click data and a total number of topics in the user click data; and
         determining a vector representation of each of the plurality of candidate topics in terms of the plurality of word elements in the vocabulary, wherein the determining the vector representation of each of the plurality of candidate topics in terms of the plurality of word elements in the vocabulary comprises representing the each of the plurality of candidate topics based on a vector representation of each of the plurality of queries, a total number of user clicks or selections of a candidate topic for a query in the user click data and a total number of user queries in the user click data; and
      ranking the plurality of candidate topics based on the similarity scores;
      selecting one or more topics from the ranked candidate topics; and
      outputting the topics via a user interface (UI).

10. The computer-implemented system of claim 9, the operations further comprising:
   before determining a similarity score between the query and each candidate topic based on a Vector Propagation On a Click Graph (VPCG) model trained based on user click data, performing a first ranking to select a second one or more topics from the plurality of candidate topics; and
   in response to determining that each of the second one or more topics does not meet a specified criterion, performing a second ranking based on the VPCG model trained based on user click data, wherein performing the second ranking comprises:
      the determining a similarity score between the query and each candidate topic based on a VPCG model trained based on user click data; and
      the ranking the plurality of candidate topics based on the similarity scores.

11. The computer-implemented system of claim 9, wherein the user click data comprise a plurality of user selections in response to a plurality of queries from a plurality of users, wherein each of the plurality of user selections comprises a respective user's selection of a relevant topic to the user's query among a plurality of candidate topics provided to the user based on the user's query.

12. The computer-implemented system of claim 9, further comprising training the VPCG model based on the user click data.

13. The computer-implemented system of claim 9, wherein the determining a similarity score between the query and each of the plurality of candidate topics based on a VPCG model trained based on user click data comprises:
   determining a vector representation of the query from the user in terms of a plurality of word elements in a vocabulary;
   determining a vector representation of each of the plurality of candidate topics in terms of the plurality of word elements in the vocabulary; and
   calculating the similarity score between a vector representation of the query and the vector representation of each of the plurality of candidate topics.

14. A non-transitory, computer-readable medium storing one or more instructions executable by a computer-implemented system to perform operations comprising:
   receiving, at a data service engine, a query from a user, wherein the query comprises a string of characters;

identifying, by the data service engine, a plurality of candidate topics based on the query;
determining a similarity score between the query and each of the plurality of candidate topics based on a Vector Propagation On a Click Graph (VPCG) model trained based on user click data, wherein the VPCG model is trained by:
  identifying a plurality of queries from a plurality of users in the user click data;
  identifying a plurality of user selections in response to the plurality of queries from the plurality of users in the user click data;
  determining a vector representation of each of the plurality of queries in terms of a plurality of word elements in a vocabulary, wherein the determining the vector representation of each of the plurality of queries in terms of the plurality of word elements in the vocabulary comprises representing the each of the plurality of queries based on a vector representation of each of plurality of candidate topics, a total number of user clicks or selections of a candidate topic for a query in the user click data and a total number of topics in the user click data; and
  determining a vector representation of each of the plurality of candidate topics in terms of the plurality of word elements in the vocabulary, wherein the determining the vector representation of each of the plurality of candidate topics in terms of the plurality of word elements in the vocabulary comprises representing the each of the plurality of candidate topics based on a vector representation of each of the plurality of queries, a total number of user clicks or selections of a candidate topic for a query in the user click data and a total number of user queries in the user click data; and
ranking the plurality of candidate topics based on the similarity scores;
selecting one or more topics from the ranked candidate topics; and
outputting the topics via a user interface (UI).

15. The non-transitory, computer-readable medium of claim 14, the operations further comprising:
  before determining a similarity score between the query and each candidate topic based on a Vector Propagation On a Click Graph (VPCG) model trained based on user click data, performing a first ranking to select a second one or more topics from the plurality of candidate topics;
  in response to determining that each of the second one or more topics does not meet a specified criterion, performing a second ranking based on the VPCG model trained based on user click data, wherein performing the second ranking comprises:
    the determining a similarity score between the query and each candidate topic based on a VPCG model trained based on user click data; and
    the ranking the plurality of candidate topics based on the similarity scores.

16. The non-transitory, computer-readable medium of claim 14, wherein the user click data comprise a plurality of user selections in response to a plurality of queries from a plurality of users, wherein each of the plurality of user selections comprises a respective user's selection of a relevant topic to the user's query among a plurality of candidate topics provided to the user based on the user's query.

17. The non-transitory, computer-readable medium of claim 14, wherein the determining a similarity score between the query and each of the plurality of candidate topics based on a VPCG model trained based on user click data comprises:
  determining a vector representation of the query from the user in terms of a plurality of word elements in a vocabulary;
  determining a vector representation of each of the plurality of candidate topics in terms of the plurality of word elements in the vocabulary; and
  calculating the similarity score between a vector representation of the query and the vector representation of each of the plurality of candidate topics.

* * * * *